United States Patent
Hirano et al.

(10) Patent No.: US 11,230,788 B2
(45) Date of Patent: Jan. 25, 2022

(54) ELECTRODEPOSITION LIQUID AND ELECTRODEPOSITION-COATED ARTICLE

(71) Applicant: MITSUBISHI MATERIALS CORPORATION, Tokyo (JP)

(72) Inventors: Koji Hirano, Amagasaki (JP); Shintaro Iida, Naka (JP); Jyunko Hirata, Kagawa-gun (JP); Hideaki Sakurai, Amagasaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 235 days.

(21) Appl. No.: 16/077,686

(22) PCT Filed: Feb. 14, 2017

(86) PCT No.: PCT/JP2017/005222
§ 371 (c)(1),
(2) Date: Aug. 13, 2018

(87) PCT Pub. No.: WO2017/141885
PCT Pub. Date: Aug. 24, 2017

(65) Prior Publication Data
US 2019/0032238 A1   Jan. 31, 2019

(30) Foreign Application Priority Data

Feb. 18, 2016 (JP) .............................. JP2016-028698
Jan. 23, 2017 (JP) .............................. JP2017-009063

(51) Int. Cl.
| | |
|---|---|
| C25D 13/06 | (2006.01) |
| C25D 13/16 | (2006.01) |
| H01B 13/06 | (2006.01) |
| C08G 73/10 | (2006.01) |
| C09D 7/45 | (2018.01) |
| C09D 179/08 | (2006.01) |
| C08G 73/14 | (2006.01) |
| C09D 5/44 | (2006.01) |
| H01B 13/16 | (2006.01) |
| H01B 7/02 | (2006.01) |
| H01B 3/30 | (2006.01) |

(52) U.S. Cl.
CPC ......... C25D 13/06 (2013.01); C08G 73/1035 (2013.01); C08G 73/14 (2013.01); C09D 5/4461 (2013.01); C09D 7/45 (2018.01); C09D 179/08 (2013.01); C25D 13/16 (2013.01); H01B 3/306 (2013.01); H01B 7/02 (2013.01); H01B 13/065 (2013.01); H01B 13/16 (2013.01)

(58) Field of Classification Search
CPC ........ C25D 13/06; C25D 13/16; C25D 13/10; C25D 13/04; C09D 7/45; C09D 5/4461; C09D 179/08; C09D 7/63; C09D 7/40; C09D 7/65; C09D 5/02; C09D 5/44; C08G 73/1035; C08G 73/14; C08G 73/1067; C08G 73/1007; C08G 73/1032; H01B 3/306; H01B 7/02; H01B 13/065; H01B 13/16; C08K 5/17; C08L 79/08
See application file for complete search history.

(56) References Cited

U.S. PATENT DOCUMENTS

| | | | |
|---|---|---|---|
| 3,892,716 A | 7/1975 | Boldebuck | |
| 4,252,707 A | * 2/1981 | Ruid | ................... C09D 179/08 |
| | | | 524/104 |

FOREIGN PATENT DOCUMENTS

| | | | |
|---|---|---|---|
| EP | 3395917 A1 | 10/2018 | |
| JP | 52-030846 A | 3/1977 | |
| JP | S5230846 | * 3/1977 | |
| JP | 64-43578 A | 2/1989 | |
| JP | 03-159014 A | 7/1991 | |
| JP | 03-241609 A | 10/1991 | |
| JP | 04-065159 B | 10/1992 | |
| JP | 2012-160304 A | 8/2012 | |
| JP | 2014-173110 A | 9/2014 | |
| WO | WO-2016/031480 A | 3/2016 | |

OTHER PUBLICATIONS

Machine translation of JPS5230846 (Year: 1977).*
Taiwanese Office Action dated May 12, 2020 for the corresponding Taiwanese Patent Application No. 106104927.
International Search Report dated Mar. 21, 2017 for the corresponding PCT Application No. PCT/JP2017/005222.
Extended European Search Report dated Sep. 9, 2019 for the corresponding European Patent Application No. 17753142.3.

* cited by examiner

*Primary Examiner* — Xiuyu Tai
(74) *Attorney, Agent, or Firm* — Leason Ellis LLP

(57) ABSTRACT

Provided is an electrodeposition dispersion including a polyamide-imide resin, a polar solvent, water, a poor solvent, and a base, in which the polar solvent is an organic solvent having a boiling point of higher than 100° C. and $D_{(S-P)}$ represented by a formula (1) satisfying a relationship of $D_{(S-P)}<6$, and a weight-average molecular weight of the polyamide-imide is $10\times10^4$ to $30\times10^4$ or a number-average molecular weight of the polyamide-imide is $2\times10^4$ to $5\times10^4$.

$$D_{(S-P)}=[(dD^S-dD^P)^2+(dP^S-dP^P)^2+(dH^S-dH^P)^2]^{1/2} \quad (1)$$

6 Claims, 3 Drawing Sheets

ELECTRODEPOSITION LIQUID AND ELECTRODEPOSITION-COATED ARTICLE

CROSS-REFERENCE TO RELATED PATENT APPLICATIONS

This application is a U.S. National Phase Application under 35 U.S.C. § 371 of International Patent Application No. PCT/JP2017/005222, filed Feb. 14, 2017, and claims the benefit of Japanese Patent Application No. 2016-028698, filed on Feb. 18, 2016 and Japanese Patent Application No. 2017-009063, filed on Jan. 23, 2017, all of which are incorporated herein by reference in their entirety. The International Application was published in Japanese on Aug. 24, 2017 as International Publication No. WO/2017/141885 under PCT Article 21(2).

FIELD OF THE INVENTION

The present invention relates to an electrodeposition dispersion including a polyamide-imide resin, a polar solvent, water, a poor solvent, and a base and an electrodeposition-coated body obtained by coating a body to be coated with a polyamide-imide by means of the electrodeposition coating of this electrodeposition dispersion.

BACKGROUND OF THE INVENTION

In the related art, as a method for forming an insulating film on a conductive wire having a rectangular cross section shape (hereinafter, simply referred to as a "flat (or rectangular) shape"), dip coating in which a body to be coated is dipped in paint and then lifted, then, the paint is dried, and coating is repeated until a predetermined insulating film thickness is obtained or electrodeposition coating in which electrodes are inserted into an electrodeposition dispersion so as to conduct currents, electrodeposition particles are deposited on a flat conductive wire used as a cathode, and the formed insulating film is semi-cured, rolled, and then cured, thereby forming an insulation conductive wire has been carried out (for example, refer to Japanese Unexamined Publication No. H03-159014 (A) (the right column on page 1 through the upper right column on page 2)). Meanwhile, as electrodeposition coating, a method in which a flat conductive wire is passed through an electrodeposition vessel filled with an electrodeposition dispersion and, subsequently, passed through a solvent vessel filled with an organic solvent or passed through the mist or vapor of an organic solvent and then baked, thereby forming an insulating film is disclosed (for example, refer to Japanese Unexamined Publication No. H03-241609 (A) (the lower left column on page 4 through the upper left column on page 5)). Furthermore, as a method for electrodeposition-coating a flat conductive wire in an electrodeposition dispersion and then spraying an organic solvent, a method for generating the mist of an organic solvent using ultrasonic waves or a method in which the vapor of an organic solvent is sprayed from a spray nozzle is disclosed (for example, refer to Japanese Examined Publication No. H04-065159 (B) (the left column on page 2) and Japanese Unexamined Publication No. 2012-160304 (A) (Paragraph [0006])).

TECHNICAL PROBLEM

However, in the dip coating of the related art described in Japanese Unexamined Publication No. H03-159014, it is difficult to attach the paint to the corner parts of the flat conductive wire, uneven coating is caused, and a large number of times of coating needs to be repeated in order to obtain a predetermined insulating film thickness. In addition, in the electrodeposition coating, electric field concentration is caused on the corner parts of the flat conductive wire, and thus the insulating film becomes thick at the corner parts, and it is necessary to roll the conductive wire in a semi-cured state. In addition, in the method of the related art in which the conductive wire is passed through the organic solvent which is described in Japanese Unexamined Publication No. H03-241609, insulating films having a uniform insulating film thickness and no pinholes can be used; however, in a case in which the organic solvent is a liquid, there is a problem in that, even when the conductive wire is dipped in this liquid-form organic solvent, the liquid does not intrude into voids between resin particles and cannot be sufficiently dissolved due to surface tension or the like. In addition, in a case in which the organic solvent is vapor or mist, there is a problem in that the control of the temperature or amount of the vapor or mist-form organic solvent is difficult. In the method of the related art in which the mist of the organic solvent is generated using ultrasonic waves or the method of the related art in which the vapor of the organic solvent is sprayed from a spray nozzle which is described in Japanese Examined Publication No. H04-065159 (B) and Japanese Unexamined Publication No. 2012-160304 (A), the temperature or amount of the organic solvent can be adjusted. However, in order for that, a complicated apparatus constitution of an ultrasonic wave-generating apparatus or a vapor-spraying apparatus using a nozzle, other control apparatuses, and the like and the control thereof are required. Furthermore, there is a concern that the organic solvent may be discharged to the atmosphere, the influence on human bodies is concerned, and special fire prevention measures also need to be considered.

An object of the present invention is to provide an electrodeposition dispersion and an electrodeposition-coated body capable of forming insulating films having no pinholes, having excellent insulation characteristics, and having a uniform film thickness. Another object of the present invention is to provide an electrodeposition dispersion and an electrodeposition-coated body which are capable of conveniently forming insulating films having no pinholes and a flat surface in a safe environment.

SUMMARY OF THE INVENTION

Solution to Problem

According to a first aspect of the present invention, there is provided an electrodeposition dispersion including: a polyamide-imide resin; a polar solvent; water; a poor solvent; and a base, wherein the polar solvent is an organic solvent having a boiling point of higher than 100° C. and $D_{(S-P)}$ represented by a formula (1) satisfying a relationship of $D_{(S-P)} < 6$, and a weight-average molecular weight of the polyamide-imide (resin) is $10 \times 10^4$ to $30 \times 10^4$ or a number-average molecular weight of the polyamide-imide (resin) is $2 \times 10^4$ to $5 \times 10^4$, $D_{(S-P)} = [(dD^S - dD^P)^2 + (dP^S - dP^P)^2 + (dH^S - dH^P)^2]^{1/2}$ (1), in a formula (1), $dD^S$ represents a dispersion term of an HSP value of the polar solvent, $dD^P$ represents a dispersion term of an HSP value of the polyamide-imide (resin), $dP^S$ represents a polarity term of the HSP value of the polar solvent, $dP^P$ represents a polarity term of the HSP value of the polyamide-imide (resin), $dH^S$ represents a hydrogen bonding term of the HSP value of the polar solvent, and $dH^P$ represents a hydrogen bonding term of the HSP value of the polyamide-imide (resin) (hereinafter, referred to as "the electrodeposition dispersion of the present invention").

A second aspect of the present invention is an invention according to the first aspect, in which, furthermore, in a case in which a mixture of the polyamide-imide (resin) and the polar solvent becomes transparent, the polar solvent is defined as a polyamide-imide-soluble polar solvent, in a case in which the mixture of the polyamide-imide (resin) and the polar solvent becomes white turbid, the polar solvent is defined as a polyamide-imide-insoluble polar solvent, the $dD^S$, $dP^S$, and $dH^S$ of the polar solvent are plotted in a three-dimensional graph, a center of a minimum sphere including all of points represented by the polyamide-imide (resin)-soluble polar solvent therein is assumed as the $dD^P$, $dP^P$, and $dH^P$ of the polyamide-imide (resin), and a polar solvent satisfying the relationship of $D_{(S-P)}<6$ is selected (hereinafter, referred to as "the electrodeposition dispersion of the present invention").

A third aspect of the present invention is an invention according to the first or second aspect, in which, furthermore, the polar solvent is a hydrophilic solvent (hereinafter, referred to as "the electrodeposition dispersion of the present invention").

A fourth aspect of the present invention is an invention according to any one of the first to third aspects, in which, furthermore, the polar solvent is N,N-dimethylacetamide, N,N-dimethylformamide, propylene carbonate, dimethyl sulfoxide, 4-butyrolactone, N-methyl-2-pyrrolidone, or 1,3-dimethyl-2-imidazolidinone (hereinafter, referred to as "the electrodeposition dispersion of the present invention").

According to a fifth aspect of the present invention, there is provided an electrodeposition-coated body including: a body to be coated; and an insulating film which is formed on a surface of the body to be coated and made of the polyamide-imide resin according to the first aspect, wherein, in the insulating film formed on the surface of the body to be coated, the number of pinholes is 50 pinholes/10 µm² or less, a surface roughness Ra is 50 nm or less, the body to be coated is a conductive wire with a rectangular cross section, and a difference between a thickness of the insulating film on a flat surface part of the conductive wire and a thickness of the insulating film on a corner part of the conductive wire is 5 µm or less (hereinafter, referred to as "the electrodeposition-coated body of the present invention").

Advantageous Effects of Invention

In the electrodeposition dispersion of the first aspect of the present invention, since the polar solvent, water, the poor solvent, and the base are added to the electrodeposition dispersion including the polyamide-imide, a vessel of an organic solvent or an apparatus that generates and sprays mist or vapor and a control apparatus are not required, and the organic solvent is not turned into vapor or mist, and thus the concern of the organic solvent being discharged to the atmosphere is decreased, and it is possible to form a safe manufacturing environment and conveniently manufacture electrodeposition-coated bodies. In addition, since the boiling point of the polar solvent is higher than 100° C., even when the temperature exceeds 100° C. and thus moisture in the electrodeposition dispersion evaporates in a step of attaching the electrodeposition dispersion to the surface of the body to be coated by baking, the polar solvent remains, and the effect of the polar solvent swelling and dissolving the polyamide-imide can be expected for a long period of time. That is, in the related art, in the case of adding a polar solvent that is slightly compatible with polyamide-imides, polar solvent molecules are not capable of easily intruding into polymer chains constituting polyamide-imide particles, and thus the polymer chains do not collapse, the film-forming property does not improve, and there are cases in which cracks or pinholes are generated. In contrast, in the present invention, the solubility of the polar solvent in the polyamide-imide is regulated as the formula of $D_{(S-P)}<6$ using the Hansen solubility parameter, and thus it is possible to select and add a polar solvent that is highly compatible with the polyamide-imide. As a result, in the present invention, polyamide-imide particles swell, that is, polar solvent molecules intrude into polymer chains forming the polyamide-imide particles and thus the polymer chains collapse, the polyamide-imide particles easily fuse one another during thermal curing, and the firm-forming property improves, and thus it is possible to manufacture electrodeposition-coated bodies having a flat insulating film having no cracks or pinholes and having excellent insulation characteristics.

Furthermore, the weight-average molecular weight of the polyamide-imide is $10\times10^4$ to $30\times10^4$ or the number-average molecular weight of the polyamide-imide (resin) is $2\times10^4$ to $5\times10^4$, and thus, when a surface of a body to be coated such as a c conductive wire with a rectangular cross section is electrodeposition-coated with an insulating film using an electrodeposition dispersion including the polyamide-imide particles, no difference is caused between the thickness of the insulating film on a flat surface part of the body to be coated and the thickness of the insulating film on a sharp corner part of the body to be coated, and an insulating film having an excellent film thickness uniformity can be provided by coating. When the thickness of the insulating film becomes equal to or more than a certain thickness, bubbles are likely to be generated. In addition, when the insulating film is formed to be thicker on corner parts than on flat surface parts, there are cases in which bubbles are generated on the corner parts even when no bubbles are generated on the flat surface parts. However, according to the electrodeposition dispersion of the first aspect of the present invention, all of the flat surface parts and the corner parts of an insulating film are uniformly deposited, and thus the insulating film can be formed to be thick throughout without causing the generation of bubbles.

In the electrodeposition dispersion of the second aspect of the present invention, in a case in which the mixture of the polyamide-imide and the polar solvent becomes transparent, the polar solvent is defined as a polyamide-imide-soluble polar solvent, in a case in which the mixture of the polyamide-imide and the polar solvent becomes white turbid, the polar solvent is defined as a polyamide-imide-insoluble polar solvent, the $dD^S$, $dP^S$, and $dH^S$ of the polar solvent are plotted in a three-dimensional graph, the center of the minimum sphere including all of the points represented by the polymer-soluble polar solvent therein is assumed as the $dD^P$, $dP^P$, and $dH^P$ of the polyamide-imide, and a polar solvent satisfying the relationship of $D_{(S-P)}<6$ is selected, and thus, as described above, it is possible to select and add a polar solvent that is highly compatible with the polyamide-imide. As a result, the polyamide-imide particles swell, that is, the polar solvent molecules intrude into the polymer chains forming the polyamide-imide particles and thus the polymer chains collapse, the polyamide-imide particles easily fuse one another during thermal curing, and the firm-forming property improves, and thus it is possible to manufacture electrodeposition-coated bodies having a flat insulating film having no cracks or pinholes and having excellent insulation characteristics.

In the electrodeposition dispersion of the third aspect of the present invention, since the polar solvent is a hydrophilic solvent, an electrodeposition dispersion in which the polyamide-imide particles are dispersed in water or water and an organic solvent can be obtained. As a result, it is possible to reliably form an insulating film of the polyamide-imide on the surface of the body to be coated using the electrodeposition dispersion.

In the electrodeposition dispersion of the fourth aspect of the present invention, since N,N-dimethylacetamide, N,N-dimethylformamide, propylene carbonate, dimethyl sulfoxide, 4-butyrolactone, N-methyl-2-pyrrolidone, or 1,3-dimethyl-2-imidazolidinone is used as the polar solvent, it is possible to disperse polyamide-imide particles having a weight-average molecular weight of $10 \times 10^4$ to $30 \times 10^4$ or a number-average molecular weight of $2 \times 10^4$ to $5 \times 10^4$ in the electrodeposition dispersion. As a result, it is possible to provide an insulating film having an excellent film thickness uniformity on the surface of the body to be coated by coating using this electrodeposition dispersion.

In the electrodeposition-coated body of the fifth aspect of the present invention, since the number of pinholes is 50 pinholes/10 µm² or less, the insulating film formed on the surface of the body to be coated has excellent insulation characteristics and is capable of maintaining insulation performance even in severe environments under the harsh irradiation with electron beams, cosmic rays, ultraviolet rays, and the like. In addition, since the surface roughness Ra is 50 nm or less, the film thickness of the insulating film becomes uniform on the flat surface parts. Furthermore, the difference between the thickness of the insulating film on a flat surface part of the conductive wire with a rectangular cross section and the thickness of the insulating film on the corner part of the conductive wire with a rectangular cross section is 5 µm or less. As described above, when the thickness of the insulating film becomes equal to or more than a certain thickness, bubbles are likely to be generated, and, if the insulating film is formed to be thicker on the corner parts than on the flat surface parts, there are cases in which bubbles are generated on the corner parts even when no bubbles are generated on the flat surface parts, and thus the insulating film can be formed to be thick throughout without causing the generation of bubbles by uniformly depositing all of the flat surface parts and the corner parts of the insulating film.

DETAILED DESCRIPTION OF THE INVENTION

Figure 1:
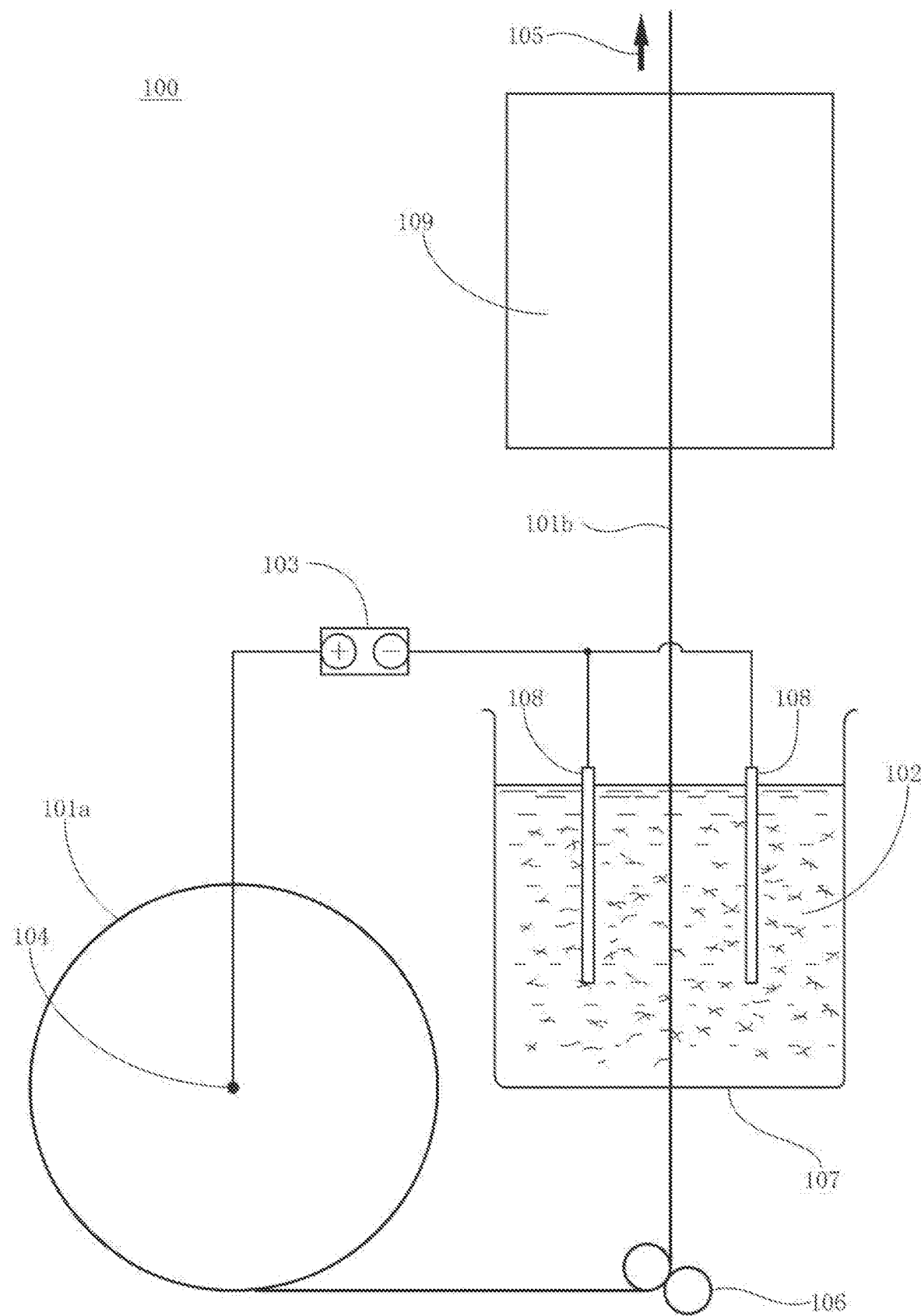
FIG. 1 is a view schematically illustrating an electrodeposition coating apparatus of an embodiment of the present invention.

Next, embodiments for carrying out the present invention will be described on the basis of drawings. An electrodeposition dispersion of the present invention includes a polyamide-imide resin, a polar solvent, water, a poor solvent, and a base. The polar solvent is an organic solvent having a boiling point of higher than 100° C. and $D_{(S-P)}$ represented by a formula (1) satisfying a relationship of $D_{(S-P)} < 6$.

$$D_{(S-P)} = [(dD^S - dD^P)^2 + (dP^S - dP^P)^2 + (dH^S - dH^P)^2]^{1/2} \quad (1)$$

Here, in the formula (1), $dD^S$ represents a dispersion term of a Hansen Solubility Parameter (HSP) value of the polar solvent, $dD^P$ represents a dispersion term of an HSP value of the polyamide-imide (resin), $dP^S$ represents a polarity term of the HSP value of the polar solvent, $dP^P$ represents a polarity term of the HSP value of the polyamide-imide (resin), $dH^S$ represents a hydrogen bonding term of the HSP value of the polar solvent, and $dH^P$ represents a hydrogen bonding term of the HSP value of the polyamide-imide (resin).

Here, the boiling point of the polar solvent being limited to a range of higher than 100° C. is based on the following reason. The reason is to evaporate water first from the electrodeposition dispersion including water and the polyamide-imide during baking. That is, this is because, if the polar solvent evaporates earlier than water, the effect of the polar solvent swelling and dissolving the polyamide-imide during baking cannot be expected. Swelling expects an effect that the polar solvent intrudes between polymer chains constituting the polyamide-imide and, when the polyamide-imide swells and fuses to adjacent polyamide-imide particles, the polyamide-imide is likely to stick to the adjacent polyamide-imide particles. In addition, an effect that the polar solvent intrudes between the polymer chains and splits the bonds between the polymer chains and the polyamide-imide dissolves can also be expected. This intends to dissolve the polyamide-imide using the polar solvent so as to prevent the polyamide-imide from beginning to cure from the intrinsic curing temperature of the polyamide-imide of 80° C., thereby enabling the baking of a conductive wire in a state in which the polyamide-imide that dissolves without being cured is uniformly attached to a surface of the conductive wire as a fluid even after moisture evaporates.

Meanwhile, in the electrodeposition dispersion, the weight-average molecular weight of the polyamide-imide is $10 \times 10^4$ to $30 \times 10^4$ or the number-average molecular weight of the polyamide-imide is $2 \times 10^4$ to $5 \times 10^4$. Here, the reason for limiting the weight-average molecular weight of the polyamide-imide to the range of $10 \times 10^4$ to $30 \times 10^4$ or limiting the number-average molecular weight of the polyamide-imide to the range of $2 \times 10^4$ to $5 \times 10^4$ is that, when the weight-average molecular weight is less than $10 \times 10^4$ or the number-average molecular weight is less than $2 \times 10^4$, the film thickness of an insulating film formed using the electrodeposition dispersion becomes uneven, and, when the weight-average molecular weight is more than $30 \times 10^4$ or the number-average molecular weight is more than $5 \times 10^4$, the polyamide-imide cannot be synthesized. Meanwhile, in the present specification, the weight-average molecular weight and the number-average molecular weight of the polyamide-imide are molecular weights respectively measured by converting numerical values detected using a high performance GPC system (manufactured by Tosoh Corporation: HLC-8320GPC), a column with an exclusion limit molecular weight of 4×10$^7$ or more (manufactured by Tosoh Corporation: TSKgel Super AWM-H), and a differential refractometer in terms of standard polystyrene. Here, when the measured molecular weight is represented by Mi, and the number of measured polymer molecules is represented by Ni, the weight-average molecular weight (Mw) is computed from a formula (2), and the number-average molecular weight (Mn) is computed from a formula (3).

$$Mw=\Sigma(Mi^2 \cdot Ni)/\Sigma(Mi \cdot Ni) \tag{2}$$

$$Mn=\Sigma(Mi \cdot Ni)/\Sigma Ni \tag{3}$$

The polar solvent is preferably a hydrophilic solvent. Examples of the polar solvent include N,N-dimethylacetamide, N,N-dimethylformamide, propylene carbonate, dimethyl sulfoxide, 4-butyrolactone, N-methyl-2-pyrrolidone, 1,3-dimethyl-2-imidazolidinone, and the like. In addition, examples of the poor solvent include isopropyl alcohol, 1-methoxy-2-propanol, cyclohexanone, and the like, and examples of the base include N,N-dimethylaminoethanol, triethylamine, tripropylamine, triethanolamine, imidazole, and the like.

The poor solvent mentioned herein refers to a solvent having a low solubility of polyamide-imides and specifically refers to a solvent having a solubility of polyamide-imides of (1 g/100 g-the solvent) or less.

Meanwhile, it is preferable that, in a case in which a mixture of the polyamide-imide and the polar solvent becomes transparent, the polar solvent is defined as a polyamide-imide-soluble polar solvent, in a case in which the mixture of the polyamide-imide and the polar solvent becomes white turbid, the polar solvent is defined as a polyamide-imide-insoluble polar solvent, and when the $dD^S$, $dP^S$, and $dH^S$ of the polar solvent are plotted in a three-dimensional graph, the center of a minimum sphere including all of points represented by the polyamide-imide-soluble polar solvent therein is assumed as the $dD^P$, $dP^P$, and $dH^P$ of the polyamide-imide, thereby selecting a polar solvent satisfying the relationship of $D_{(S-P)}<6$. Therefore, it is possible to select and add a polar solvent that is highly compatible with the polyamide-imide. As a result, polyamide-imide particles swell, that is, polar solvent molecules intrude into the polymer chains forming the polyamide-imide particles and thus the polymer chains collapse, the polyamide-imide particles easily fuse one another during thermal curing, and the firm-forming property improves, and thus it is possible to manufacture electrodeposition-coated bodies having a flat insulating film having no cracks or pinholes and having excellent insulation characteristics.

Specifically, a method for selecting a polar solvent having a high solubility of polyamide-imides using the Hansen solubility parameter will be described. First, polyamide-imide particles and each of a variety of polar solvents are mixed together, thereby producing a solution of 1% by mass of the polyamide-imide particles in the polar solvent. The respective solutions are classified into two groups of a group of transparent liquids in which the polyamide-imide particles gelatinize and a group of white-turbid liquids in which the polyamide-imide particles are deposited. Next, the dispersion term $dD^S$, polarity term $dP^S$, hydrogen bonding term $dH^S$ of the Hansen solubility parameter of each polar solvent are plotted in a three-dimensional graph, a sphere having the minimum radius is produced so that the group of the solutions which become a transparent liquid is present inside and the group of the solutions which become a white-turbid liquid is present outside, and the center of the sphere is assumed as the Hansen solubility parameter of the polyamide-imide. A polar solvent of which a value obtained by substituting the assumed Hansen solubility parameter of the polyamide-imide and the Hansen solubility parameter of the polar solvent into the formula (1) satisfies $D_{(S-P)}<6$ is selected as a polar solvent having a high solubility of polyamide-imides.

A method for manufacturing an electrodeposition dispersion constituted as described above will be described. First, N-methyl-2-pyrrolidone (NMP), 4,4'-diphenylmethane diisocyanate, and trimellitic anhydride are mixed together in a predetermined ratio so as to prepare a mixture, and then the mixture is heated to 40° C. to 60° C. and stirred for one to two hours at this temperature. Next, the mixture is heated up to 170° C. to 180° C., held for two to five hours at this temperature (a first heating treatment) so as to cause a reaction, and then cooled to 40° C. to 80° C. Next, this cooled mixture is diluted by adding a predetermined amount of N-methyl-2-pyrrolidone. Therefore, a mixture including a polyamide-imide (PAI) is obtained. This mixture is further diluted using a polar solvent, a predetermined amount of a poor solvent and a predetermined amount of a base are added to the diluted mixture, and the components are stirred together. Furthermore, a predetermined amount of water is added dropwise to the mixture under stirring at a rotation speed of 8,000 to 12,000 rpm. Therefore, an electrodeposition dispersion in which polyamide-imide particles are dispersed is obtained. Meanwhile, between the step of carrying out the first heating treatment so as to cause the reaction and cooling the mixture to 40° C. to 80° C. and the step of diluting the cooled mixture by adding a predetermined amount of N-methyl-2-pyrrolidone thereto, (1) a step of adding hexamethylene diisocyanate (HDI) and trimellitic anhydride to the cooled mixture in a predetermined ratio, (2) a step of heating the mixture to 40° C. to 80° C. and stirring the mixture for one to three hours at this temperature, (3) a step of holding the mixture at a temperature of 170° C. to 180° C. for one to four hours (a second heating treatment) so as to cause a reaction, and (4) a step of cooling the mixture to 40° C. to 80° C. may also be included. In addition, instead of the step of heating the mixture up to 170° C. to 180° C. and holding the mixture for two to five hours at this temperature (the first heating treatment) so as to cause the reaction, a step of heating the mixture up to 140° C. to 160° C. and holding the mixture for one to three hours at this temperature (the first heating treatment) so as to cause a reaction and a step of heating the mixture up to 170° C. to 180° C. and holding the mixture for one to three hours at this temperature (the second heating treatment) so as to cause a reaction may be included.

An electrodeposition dispersion manufactured as described above is applied by means of electrodeposition coating, thereby producing an electrodeposition-coated body in which a body to be coated is coated with the polyamide-imide. This electrodeposition-coated body includes the body to be coated and an insulating film which is formed on the surface of the body to be coated and made of the polyamide-imide resin. In addition, the electrodeposition-coated body is constituted by coating a conductive wire 101b with a rectangular cross section with an electrodeposition dispersion 102 using an electrodeposition coating apparatus 100 and thermally treating the flat conductive wire 101b coated with the electrodeposition dispersion 102, thereby forming an insulating film of the polyamide-imide cured on the surface of the flat conductive wire 101b as illustrated in FIG. 1. In addition, the electrodeposition dispersion 102 prepared by adding a predetermined polar solvent selected using the above-described selection method in which the Hansen solubility parameter is used is used as an electrodeposition dispersion in the electrodeposition coating apparatus 100. Since the electrodeposition dispersion 102 including the polar solvent is used in the electrodeposition coating, it is possible to conveniently prepare the electrodeposition dispersion 102 forming a desired insulating film, and it becomes possible to carry out electrodeposition coating without separately providing a step of applying the polar solvent. Here, the conductive wire 101b with a rectangular cross section is a kind of wire obtained by drawing or rolling metal in a rectangular cross-sectional shape. In addition, the aspect ratio of the conductive wire 101b with a rectangular cross section is preferably 1 to 50.

Steps for manufacturing the electrodeposition-coated body of the present invention will be described in detail with reference to FIG. 1. FIG. 1 illustrates a method in which an electrodeposition step, a baking step, and the like are continuously carried out in the vertical direction, but the electrodeposition coating of the present invention may be carried out using any method such as a method in which the respective steps are continuously carried out in the vertical direction or a batch method in which one step is completely carried out and then the next step is carried out.

FIG. 1 is a view illustrating an example of a manufacturing step in which an insulating film is formed on the conductive wire 101b with a rectangular cross section using the electrodeposition coating apparatus 100. In a conductive wire 101a having a circular cross-sectional shape which is coiled in a cylindrical shape, a cathode 104 connected to the positive electrode of a direct-current power supply 103 is installed. The conductive wire 101a having a circular cross-sectional shape is lifted in a direction of an arrow 105, thereby being subjected to individual steps. First, as a first step, the conductive wire 101a having a circular cross-sectional shape is passed through a pair of rolling roller 106, thereby being rolled in a shape with a rectangular cross section and turned into the conductive wire 101b with a rectangular cross section (the flat conductive wire 101b). Next, as a second step, the flat conductive wire 101b is passed through an electrodeposition vessel 107 filled with the electrodeposition dispersion 102. In the electrodeposition dispersion 102 in the electrodeposition vessel 107, anodes 108 connected to the negative electrode of the direct-current power supply 103 are installed around the flat conductive wire 101b being passed through. When the flat conductive wire 101b passes through the electrodeposition vessel 107, a direct-current voltage is applied thereto from the direct-current power supply 103, whereby the polyamide-imide resin dissolved in the electrodeposition dispersion 102 is electrodeposited on the surface of the flat conductive wire 101b. Furthermore, as a third step, the flat conductive wire 101b lifted from the electrodeposition vessel 107 is passed through a baking furnace 109, and the polyamide-imide resin electrodeposited on the flat conductive wire 101b is attached to the flat conductive wire 101b by baking and becomes an insulating film, whereby an insulation conductive wire is obtained. Meanwhile, in the present specification, the "insulation conductive wire" refers to a conductive wire (a body to be coated) having an insulating film formed on the surface. Examples of the conductive wire include a copper wire, an aluminum wire, a steel wire, a copper alloy wire, and the like.

The temperature of the electrodeposition dispersion 102 is preferably in a range of 5° C. to 60° C., and the concentration of the polyamide-imide is preferably in a range of 1% to 40% by mass. In addition, the direct-current voltage from the direct-current power supply 103 is preferably in a range of 1 to 300 V, and the conduction time is preferably in a range of 0.01 to 30 seconds. Furthermore, the baking temperature in the baking furnace 109 is preferably in a range of 200° C. to 600° C. Meanwhile, regarding the concentration of the polar solvent, the lower limit may be set to a concentration at which no cracks are generated in the insulating film, and the upper limit may be set to a concentration at which deposition by means of electrodeposition does not become difficult due to the degradation of the conductive property of the electrodeposition dispersion 102, and the concentration is preferably approximately in a range of 1% to 70% by mass.

Figure 2:
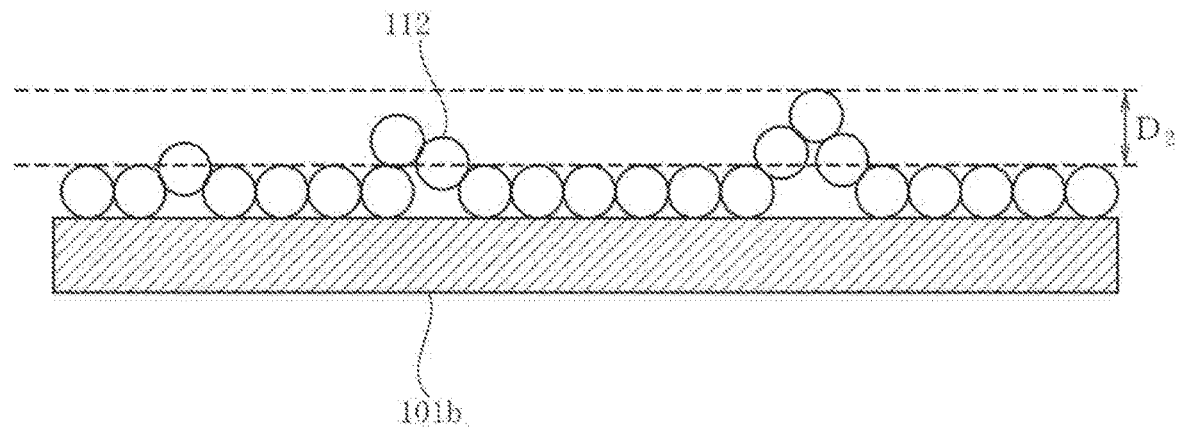
FIG. 2 is a schematic view illustrating a state in which an insulating film is formed on a surface of a body to be coated of the embodiment of the present invention.
Figure 3:
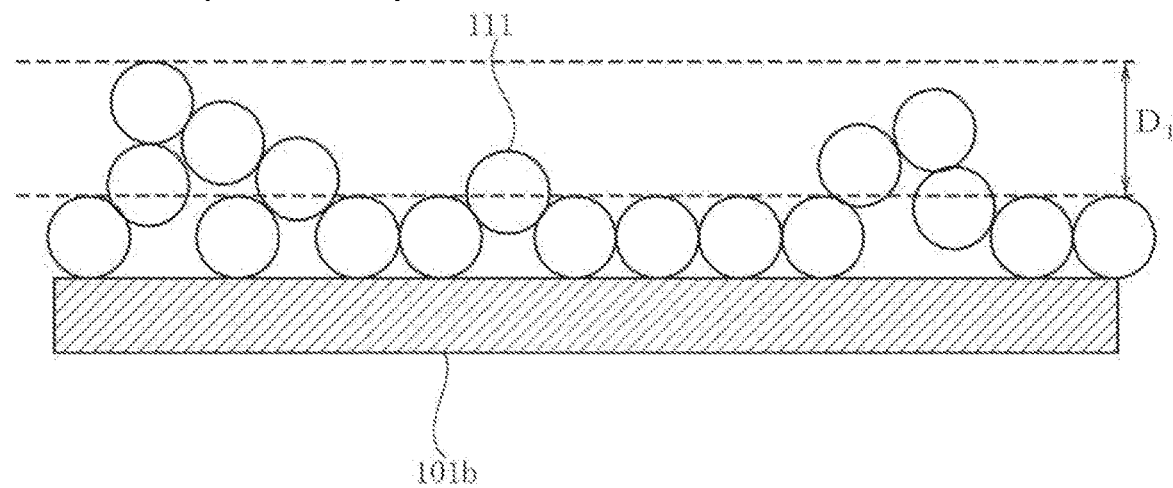
FIG. 3 is a schematic view illustrating a state in which an insulating film is formed on a surface of a body to be coated of the related art.

In the insulation conductive wire which is an electrodeposition-coated body manufactured as described above, the thickness of the insulating film on a flat surface part of the body to be coated and the thickness of the insulating film on a sharp corner part of the body to be coated do not easily differ from each other, and an insulating film having an excellent film thickness uniformity can be provided by coating. This is considered to be based on the following reason. In the related art, when large polyamide-imide particles 111 having an average particle size of more than 400 nm are used as illustrated in FIG. 3, in the initial phase of the electrodeposition step, the polyamide-imide particles 111 do not easily attach to the surface of the flat conductive wire 101b uniformly, and, in the subsequent phase of the electrodeposition step, electric current is conducted in empty spaces between the polyamide-imide particles 111, and thus polyamide-imide particles 111 attaching to the surface afterwards are unevenly connected, and thus a difference $D_1$ in the film thickness of an insulating film becomes large. In contrast, in the present invention, when small polyamide-imide particles 112 having an average particle size of 400 nm or less are used as illustrated in FIG. 2, in the initial phase of the electrodeposition step, the polyamide-imide particles 112 relatively densely attach to the surface of the flat conductive wire 101b, and the surface of the flat conductive wire 101b to which the polyamide-imide particles do not attach in the initial phase of the electrodeposition step also becomes more dense due to the intrusion of polyamide-imide particles 112 having a small average particle size in the subsequent phase of the electrodeposition step, and thus a difference $D_2$ in the film thickness of an insulating film becomes small. In addition, when the thickness of the insulating film becomes equal to or more than a certain thickness, bubbles are likely to be generated. In addition, when the insulating film is formed to be thicker on corner parts than on flat surface parts, there are cases in which bubbles are generated on the corner parts even when no bubbles are generated on the flat surface parts, and thus, when all of the flat surface parts and the corner parts of the insulating film are uniformly deposited, it is possible to form an insulating film to be thick throughout without causing the generation of bubbles. Meanwhile, in the present specification, the average particle size of the polyamide-imide particles refers to a volume-based average particle size measured using a dynamic light scattering particle size distribution analyzer (LB-550 manufactured by Horiba Ltd.).

EXAMPLES

Next, examples of the present invention will be described in detail together with comparative examples.

Example 1

First, a mixture was prepared by mixing N-methyl-2-pyrrolidone (NMP) (320 g, 3.23 mol), 4,4'-diphenylmethane diisocyanate (MDI) (181 g, 0.72 mol), and trimellitic anhydride (TMA) (139 g, 0.72 mol) in a two-liter four-neck flask including a stirrer, a cooling pipe, a nitrogen introduction pipe, and a thermometer, and this mixture was heated to 60° C. and stirred for one hour at this temperature. Next, the mixture was heated up to 180° C., held for two hours at this temperature (a first heating treatment) so as to cause a reaction, and then cooled to 60° C. Next, this cooled mixture was diluted by adding N-methyl-2-pyrrolidone (NMP) (960 g, 9.68 mol), thereby obtaining a mixture including a polyamide-imide (PAI) which had a weight-average molecular weight of $12 \times 10^4$, a number-average molecular weight of $2.2 \times 10^4$, and 20% by weight of a non-volatile component. This mixture (PAI:NMP=20% by mass:80% by mass) (2.5 g) was further diluted using 1,3-dimethyl-2-imidazolinone (DMI: polar solvent) (5.0 g), subsequently, 1-methoxypropanol (1M2P) (0.8 g) and tripropylamine (TPA) (0.015 g) were added to this diluted mixture, and the components were stirred together well. Water (1.7 g) was added dropwise to the mixture under stirring at a high speed (desirably 8,000 to 12,000 rpm), thereby obtaining an electrodeposition dispersion in which polyamide-imide particles were dispersed. A SUS sheet as a counter electrode and a copper sheet of a substance to be coated (an alternative of a flat conductive wire) were dipped in this electrodeposition dispersion, respectively connected to a cathode and an anode, and electrodeposited by causing 0.1 C (column) of charges to flow therebetween at DC 100V, and then the substance to be coated was left to stand in a muffle furnace (250° C.) for three minutes so as to be dried and baked. The copper sheet having an insulating film of the polyamide-imide formed on the surface was defined as Example 1. Meanwhile, the copper sheet was 15 mm, 15 mm, and 0.4 mm in height, width, and thickness respectively. In addition, the amount of the 1,3-dimethyl-2-imidazolinone added was 50% by mass with respect to 100% by mass of the electrodeposition dispersion.

Examples 2 to 5 and Comparative Examples 1 and 2

For each of Examples 2 to 5 and Comparative Examples 1 and 2, as shown in Table 1, the same amount of N,N-dimethylformamide (DMF), dimethyl sulfoxide (DMSO), 4-butyrolactone (4B), N-methyl-2-pyrrolidone (NMP), formaldehyde, or acetone was used instead of 1,3-dimethyl-2-imidazolinone (DMI: polar solvent) in Example 1. Except for the above-described polar solvent, an electrodeposition dispersion was prepared in the same manner as in Example 1, and an insulating film of the polyamide-imide was formed on the surface of a copper sheet using this electrodeposition dispersion.

Comparison Test 1 and Evaluation

For each of the insulating films of the polyamide-imide formed on the surface of the copper sheet of Examples 1 to 5 and Comparative Examples 1 and 2, the presence and absence of cracks, the surface roughness Ra, the number of pinholes, and the voltage resistance were respectively measured. Specifically, the presence and absence of cracks was visually determined. In addition, the surface roughness Ra was measured on the basis of JISC0601 using a surface evenness meter (manufactured by ULVAC, Inc.: stylus surface profiler). In addition, the number of pinholes was measured using a SEM photograph (magnification: 5,000 times, area: 20 μm×20 μm). Furthermore, the voltage resistance was measured using an AC voltage resistance tester (manufactured by Kikusui electronics Corp.: TOS5000). At this time, the voltage was 6,000 V, HI-Limit (upper limit current) was 5,000 μA, Ramp time (temperature-rise time) was 30 seconds. The results are shown in Table 1. Meanwhile, Table 1 also shows the kinds, boiling points, dD, dP, dH, and $D_{(S-P)}$ of the polar solvents. In addition, the polyamide-imide had a dD of 18.5, a dP of 5.7, and a dH of 8.7.

TABLE 1

| | Polar solvent | | | | | | Evaluation items | | | |
| | | | | | | | Surface | | | |
| | Kind | Boiling point (° C.) | dD | dP | dH | $D_{(S-P)}$ | Presence or absence of cracks | roughness Ra (nm) | Pinholes (pinholes/10 μm$^2$) | Voltage resistance (kV) |
| --- | --- | --- | --- | --- | --- | --- | --- | --- | --- | --- |
| Example 1 of the present invention | DMI | 220 | 18.0 | 10.5 | 9.7 | 2.6 | Absent | 50 | 0 | 4.5 |
| Example 2 of the present invention | DMF | 153 | 17.4 | 13.7 | 11.3 | 3.8 | Absent | 50 | 0 | 4.3 |
| Example 3 of the present invention | DMSO | 189 | 18.4 | 16.4 | 10.2 | 2.7 | Absent | 40 | 0 | 4.3 |
| Example 4 of the present invention | 4B | 204 | 18.0 | 16.6 | 7.4 | 4.5 | Absent | 40 | 0 | 4.4 |
| Example 5 of the present invention | NMP | 202 | 18.0 | 12.3 | 7.2 | 2.6 | Absent | 50 | 0 | 4.5 |

TABLE 1-continued

| | Polar solvent | | | | | Evaluation items | | | |
|---|---|---|---|---|---|---|---|---|---|
| | | | | | | | Surface | | |
| | Kind | Boiling point (°C.) | dD | dP | dH | $D_{(s-p)}$ | Presence or absence of cracks | roughness Ra (nm) | Pinholes (pinholes/10 µm²) | Voltage resistance (kV) |
| Comparative Example 1 | Formaldehyde | 211 | 12.8 | 14.4 | 15.4 | 18.6 | Absent | 210 | 48 | 2.1 |
| Comparative Example 2 | Acetone | 57 | 15.5 | 10.4 | 7.0 | 5.8 | Present | — | 0 | — |

As is clear from Table 1, in Examples 1 to 5, there were no cracks and no pinholes, the surface roughness was 40 to 50 nm, the voltage resistance reached 4.3 to 4.5 kV, and the copper sheets having excellent insulation characteristics were obtained. In contrast, in Comparative Example 1, while there were no cracks, the surface roughness was as great as 210 nm, a number of pinholes (48 pinholes/10 µm²) were present, the voltage resistance was as low as 2.1 kV, and the insulating film obtained poor results in the respective evaluation items compared with those of the examples. In addition, in Comparative Example 2, cracks were generated, and no comparison evaluation data were obtained for the other evaluation items.

Examples 6 and 7 and Comparative Examples 3 and 4

In Examples 6 and 7 and Comparative Examples 3 and 4, the time of the first heating treatment in Example 1 (two hours) was changed to four hours, five hours, 0.5 hours, and one hour respectively as shown in Table 2. Except for the time, each of electrodeposition dispersions was prepared in the same manner as in Example 1, and an insulating film of the polyamide-imide was formed on the surface of a copper sheet using this electrodeposition dispersion.

Example 8

First, a mixture was prepared by mixing N-methyl-2-pyrrolidone (NMP) (313 g, 3.16 mol), 4,4'-diphenylmethane diisocyanate (MDI) (162 g, 0.65 mol), and trimellitic anhydride (TMA) (124.5 g, 0.648 mol) in a two-liter four-neck flask including a stirrer, a cooling pipe, a nitrogen introduction pipe, and a thermometer, and this mixture was heated to 60° C. and stirred for one hour at this temperature. Next, the mixture was heated up to 180° C., held for two hours at this temperature (a first heating treatment) so as to cause a reaction, and then cooled to 60° C. Next, hexamethylene diisocyanate (HDI) (12 g, 0.072 mol) and trimellitic anhydride (14.5 g, 0.072 mol) were added to this cooled mixture, and the mixture was maintained at 60° C. and stirred for one hour at this temperature. Next, the mixture was heated up to 180° C., held for three hours at this temperature (a second heating treatment) so as to cause a reaction, and then cooled to 60° C. Furthermore, this cooled mixture was diluted by adding N-methyl-2-pyrrolidone (939 g, 9.47 mol), thereby obtaining a mixture including a polyamide-imide (PAI) which had a weight-average molecular weight of 17×10⁴, a number-average molecular weight of 2.4×10⁴, and 20% by weight of a non-volatile component. An electrodeposition dispersion was prepared in the same manner as in Example 1, and an insulating film of the polyamide-imide was formed on the surface of a copper sheet using this electrodeposition dispersion.

Example 9

First, a mixture was prepared by mixing N-methyl-2-pyrrolidone (NMP) (313 g, 3.16 mol), 4,4'-diphenylmethane diisocyanate (MDI) (162 g, 0.65 mol), trimellitic anhydride (TMA) (124.5 g, 0.648 mol), and ethanol (EtOH) (0.7325 g, 0.016 mol) in a two-liter four-neck flask including a stirrer, a cooling pipe, a nitrogen introduction pipe, and a thermometer, and this mixture was heated to 60° C. and stirred for four hours at this temperature. Next, the mixture was heated up to 180° C., held for two hours at this temperature (a first heating treatment) so as to cause a reaction, and then cooled to 60° C. Next, this cooled mixture was diluted by adding N-methyl-2-pyrrolidone (960 g, 9.68 mol), thereby obtaining a mixture including a polyamide-imide (PAI) which had a weight-average molecular weight of 8×10⁴, a number-average molecular weight of 2.2×10⁴, and 20% by weight of a non-volatile component. An electrodeposition dispersion was prepared in the same manner as in Example 1, and an insulating film of the polyamide-imide was formed on the surface of a copper sheet using this electrodeposition dispersion.

Example 10

First, a mixture was prepared by mixing N-methyl-2-pyrrolidone (NMP) (320 g, 3.23 mol), 4,4'-diphenylmethane diisocyanate (MDI) (181 g, 0.72 mol), and trimellitic anhydride (TMA) (139 g, 0.72 mol) in a two-liter four-neck flask including a stirrer, a cooling pipe, a nitrogen introduction pipe, and a thermometer, and this mixture was heated to 60° C. and stirred for one hour at this temperature. Next, the mixture was heated up to 140° C., held for two hours at this temperature (a first heating treatment) so as to cause a reaction, and then cooled to 60° C. Next, the mixture was heated up to 180° C. and held for two hours at this temperature (a second heating treatment) so as to cause a reaction. Furthermore, this cooled mixture was diluted by adding N-methyl-2-pyrrolidone (NMP) (960 g, 9.68 mol), thereby obtaining a mixture including a polyamide-imide (PAI) which had a weight-average molecular weight of 27×10⁴, a number-average molecular weight of 4.8×10⁴, and 20% by weight of a non-volatile component. An electrodeposition dispersion was prepared in the same manner as in Example 1, and an insulating film of the polyamide-imide was formed on the surface of a copper sheet using this electrodeposition dispersion.

Comparison Test 2 and Evaluation

The weight-average molecular weights, the number-average molecular weight, and the average particle sizes of the polyamide-imide particles in the electrodeposition dispersions before the formation of the insulating films of the polyamide-imide on the surface of the copper sheet in Example 1, Examples 6 to 10, and Comparative Examples 3 and 4 were measured respectively. The weight-average molecular weight and the number-average molecular weight of the polyamide-imide particles were measured by converting numerical values detected using a high performance GPC system (manufactured by Tosoh Corporation: HLC-8320GPC), a column with an exclusion limit molecular weight of $4 \times 10^7$ or more (manufactured by Tosoh Corporation: TSKgel Super AWM-H), and a differential refractometer in terms of standard polystyrene. Here, the flow rate was 0.600 cc/minute, the control temperature was 40° C., the sampling speed was $5 \times 10^{-3}$ cc/second, and the sample injection amount was 0.010 cc. Meanwhile, as a mobile phase, a substance obtained by adding lithium bromide (1 millimol) and phosphoric acid (100 millimol) as adsorption suppressors to dimethylacetamide was used. Here, when the measured molecular weight was represented by Mi, and the number of measured polymer molecules was represented by Ni, the weight-average molecular weight (Mw) was computed from a formula (2), and the number-average molecular weight (Mn) was computed from a formula (3).

$$Mw = \Sigma(Mi^2 \cdot Ni)/\Sigma(Mi \cdot Ni) \quad (2)$$

$$Mn = \Sigma(Mi \cdot Ni)/\Sigma Ni \quad (3)$$

In addition, as the average particle size of the polyamide-imide particles, the volume-based average particle size was measured using a dynamic light scattering particle size distribution analyzer (LB-550 manufactured by Horiba Ltd.).

Figure 4:
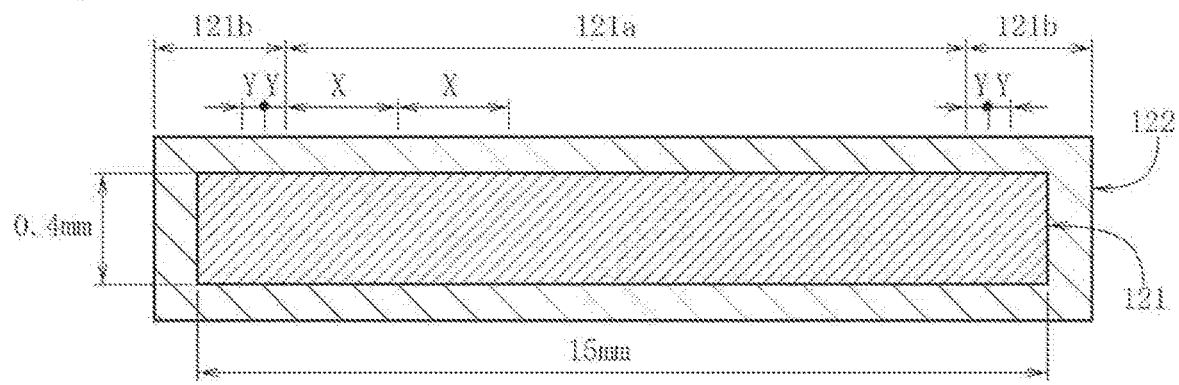
FIG. 4 is a cross-sectional view of a copper sheet illustrating a method for measuring thicknesses of insulating films of examples and comparative examples and measurement positions.

Meanwhile, as illustrated in FIG. 4, for an insulating film 122 of a polyamide-imide formed on the surface of a copper sheet 121 (height: 15 mm, width: 15 mm, and thickness: 0.4 mm) in Example 1, Examples 6 to 10, and Comparative Examples 3 and 4, the thickness of the insulating film 122 on a flat surface part 121a of the copper sheet 121 (the thickness of the insulating film on the flat surface part), the uniformity of the thickness of the insulating film 122 on the flat surface part 121a of the copper sheet 121 (the uniformity of the thickness of the insulating film on the flat surface part), the thickness of the insulating film in a corner part 121b of the copper sheet 121 (the thickness of the insulating film on the corner part), and the difference between the thickness of the insulating film 122 on the flat surface part 121a of the copper sheet 121 and the thickness of the insulating film 122 on the corner part 121b of the copper sheet 121 (the insulating film thickness difference between one on the flat surface part and one on the corner part) were measured and computed respectively. The thicknesses were respectively measured by means of cross-sectional observation at a magnification of 200 times using a microscope.

Specifically, 90% (13.5 mm) of the total length (15 mm) of the copper sheet 121 was defined as the flat surface part 121a, and 5% (0.75 mm) of the total length (15 mm) of the copper sheet 121 was defined as the corner part 121b. In addition, the thickness of the thinnest portion when the thickness of the insulating film 122 was measured every X (every 0.5 mm) on the flat surface part 121a was defined as "the thickness of the insulating film on the flat surface part." In addition, "the uniformity of the thickness of the insulating film on the flat surface part" was evaluated by calculating the difference of film thicknesses (measurement value) between the thickest portion and the thinnest portion when the thickness of the insulating film 122 was measured every X (every 0.5 mm) on the flat surface part 121a and calculating a value (ratio) by dividing the difference (measurement value) by "the thickness of the insulating film on the flat surface part." In addition, the thickness of the thickest portion when the thickness of the insulating film 122 was measured every Y (every 0.1 mm) on the corner part 121b was defined as "the thickness of the insulating film on the corner part." Furthermore, "the insulating film thickness difference between one on the flat surface part and one on the corner part" was evaluated by calculating the difference (measurement value) between "the thickness of the insulating film on the flat surface part" and "the thickness of the insulating film on the corner part" and calculating a value (ratio) by dividing the difference (measurement value) by "the thickness of the insulating film on the flat surface part." The results are shown in Table 2 and FIG. 5. Meanwhile, Table 2 also shows the kinds of raw materials during the preparation of the polyamide-imides, the first heating treatment time ($h_1$), and the second heating treatment time ($h_2$).

TABLE 2

| | Electrodeposition dispersion | | | | | | Insulating film | | | | | |
|---|---|---|---|---|---|---|---|---|---|---|---|---|
| | | | | | | PAI particles | | Thickness on flat surface part | Uniformity of thickness on flat surface part | | Thickness on corner part | Thickness difference between film on the flat surface part and film on the corner part | |
| | Preparation of PAI | | | | | | | | | | | |
| | Kind of raw materials | $h_1$ hours | $h_2$ hours | Mw × $10^4$ | Mn × $10^4$ | Average particle size nm | surface part μm | Measurement value μm | Ratio % | on corner part | Measurement value μm | Ratio % |
| Example 1 of the present invention | MDI, TMA NMP | 2 | — | 12 | 1.9 | 290 | 38 | 3 | +8 | 40 | 2 | +5 |
| Example 6 of the present invention | MDI, TMA NMP | 4 | — | 24 | 2.4 | 130 | 40 | 3 | +8 | 43 | 3 | +7 |
| Example 7 of the present invention | MDI, TMA NMP | 5 | — | 30 | 3.6 | 180 | 40 | 4 | +10 | 42 | 2 | +5 |

TABLE 2-continued

| | Preparation of PAI | | | | | | Insulating film | | | | |
|---|---|---|---|---|---|---|---|---|---|---|---|
| | | Electrodeposition dispersion | | | | | Uniformity of thickness on flat surface part | | | Thickness difference between film on the flat surface part and film on the corner part | |
| | | | | PAI particles | | | | | | | |
| | Kind of raw materials | $h_1$ hours | $h_2$ hours | Mw × $10^4$ | Mn × $10^4$ | Average particle size nm | Thickness on flat surface part μm | Measurement value μm | Ratio % | Thickness on corner part μm | Measurement value μm | Ratio % |
| Example 8 of the present invention | MDI, TMA NMP, HDI | 2 | 3 | 17 | 2.4 | 200 | 42 | 4 | +10 | 45 | 3 | +7 |
| Example 9 of the present invention | MDI, TMA NMP, EtOH | 4 | — | 8 | 2.2 | 220 | 40 | 3 | +6 | 43 | 3 | +8 |
| Example 10 of the present invention | MDI, TMA NMP | 2 | 2 | 27 | 4.8 | 180 | 38 | 3 | +8 | 41 | 3 | +8 |
| Comparative Example 3 | MDI, TMA NMP | 0.5 | — | 4 | 1.0 | | Water dispersion (production of electrodeposition dispersion) was not possible | | | | | |
| Comparative Example 4 | MDI, TMA NMP | 1 | — | 7 | 1.7 | 830 | 39 | 17 | +44 | 63 | 24 | +62 |

Figure 5:
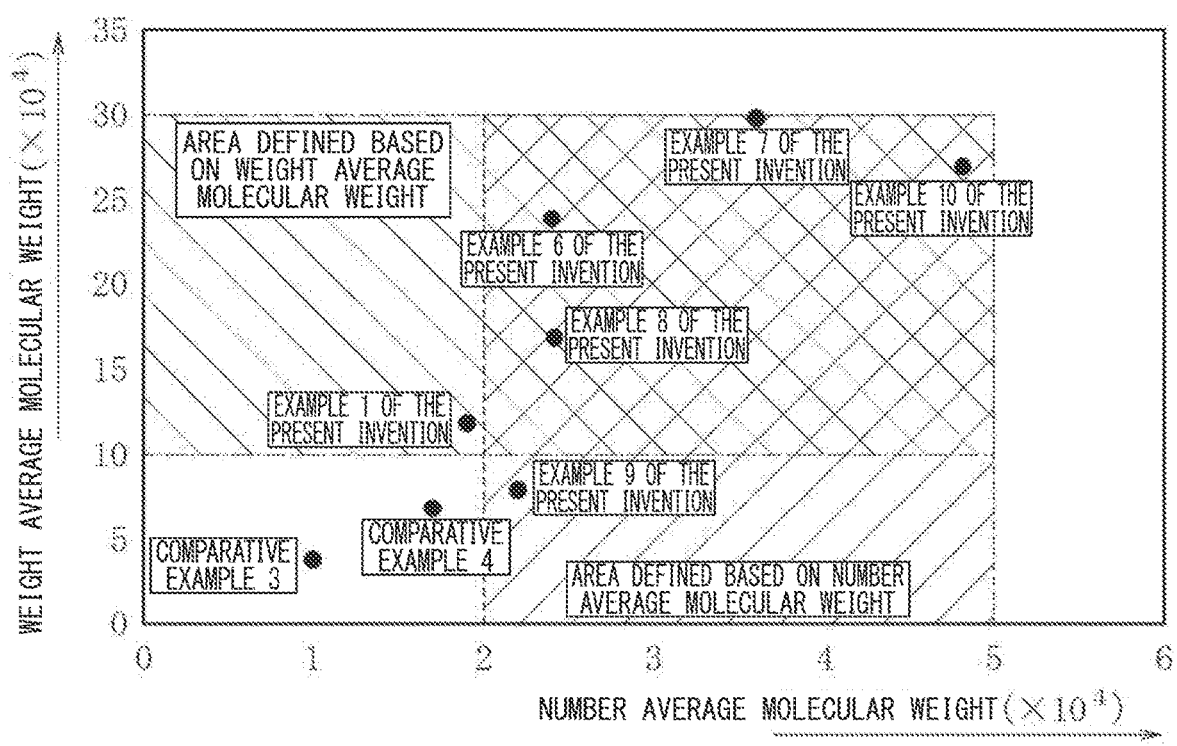
FIG. 5 is a view illustrating a relationship between a number-average molecular weight and a weight-average molecular weight of electrodeposition dispersions of Example 1, Examples 6 to 10, Comparative Example 3, and Comparative Example 4.

As is clear from Table 2 and FIG. 5, in Examples 1 and 6 to 10, the weight-average molecular weights of the polyamide-imide particles (PAI particles) were in an appropriate range of $10×10^4$ to $30×10^4$ or the number-average molecular weights were in an appropriate range of $2×10^4$ to $5×10^4$, and the average particle sizes of the polyamide-imide particles were as small as 130 to 290 nm, and thus the uniformity of the thickness of the insulating film on the flat surface part of the copper sheet, that is, the measurement values and the ratios of "the uniformity of the thickness of the insulating film on the flat surface part" were substantially uniformly maintained at 3 to 4 μm and at +6 to +10% respectively, and the difference between the thickness of the insulating film on the flat surface part of the copper sheet and the thickness of the insulating film on the corner part of the copper sheet, that is, the measurement values and the ratios of "the insulating film thickness difference between one on the flat surface part and one on the corner part" became as extremely small as 2 to 3 μm and +5 to +8% respectively. In contrast, in Comparative Example 3, the weight-average molecular weight of the polyamide-imide particles was too small ($4×10^4$) and the number-average molecular weight of the polyamide-imide particles was too small ($1.0×10^4$), and thus it was not possible to disperse the polyamide-imide particles in water and prepare an electrodeposition dispersion. In addition, in Comparative Example 4, the weight-average molecular weight of the polyamide-imide particles was too small ($7×10^4$), the number-average molecular weight of the polyamide-imide particles was too small ($1.7×10^4$), and furthermore, the average particle size of the polyamide-imide particles was too large (830 nm), and thus the uniformity of the thickness of the insulating film on the flat surface part of the copper sheet, that is, the measurement value and the ratio of "the uniformity of the thickness of the insulating film on the flat surface part" significantly changed to 17 μm and +44% respectively, and the difference between the thickness of the insulating film on the flat surface part of the copper sheet and the thickness of the insulating film on the corner part of the copper sheet, that is, the measurement value and the ratio of "the insulating film thickness difference between one on the flat surface part and one on the corner part" became as large as 24 μm and +62% respectively. Furthermore, in Comparative Example 4, there was a tendency that the thickness of the insulating film increased from the flat surface part toward the corner part of the copper sheet.

Examples 11 to 13

Insulating films of a polyamide-imide were formed on the surfaces of copper sheets respectively so as to become thinner than that in Example 1 using the same electrodeposition dispersion of Example 1. These insulating film-attached copper sheets were defined as Examples 11 to 13.

Comparison Test 3 and Evaluation

As illustrated in FIG. 4, for each of the insulating films 122 of the polyamide-imide formed on the surface of the copper sheet 121 (height: 15 mm, width: 15 mm, and thickness: 0.4 mm) in Example 1 and Examples 11 to 13, the thickness of the insulating film 122 on the flat surface part 121a of the copper sheet 121 (the thickness of the insulating film on the flat surface part), the uniformity of the thickness of the insulating film 122 on the flat surface part 121a of the copper sheet 121 (the uniformity of the thickness of the insulating film on the flat surface part), the thickness of the insulating film on the corner part 121b of the copper sheet 121 (the thickness of the insulating film on the corner part), and the difference between the thickness of the insulating film 122 on the flat surface part 121a of the copper sheet 121 and the thickness of the insulating film 122 on the corner part 121b of the copper sheet 121 (the insulating film thickness difference between one on the flat surface part and one on the corner part) were measured and computed respectively. The results are shown in Table 3. Meanwhile, specific measurement methods and computation methods are the same as those in Comparison Test 2 and will not be described again.

TABLE 3

| | Insulating film | | | | | |
|---|---|---|---|---|---|---|
| | Thickness on flat surface part μm | Uniformity of thickness on flat surface part | | Thickness difference between film on the flat surface part and film on the corner part | | |
| | | Measurement value μm | Ratio % | Thickness on corner part | Measurement value μm | Ratio % |
| Example 1 of the present invention | 38 | 3 | +8 | 40 | 2 | +5 |
| Example 11 of the present invention | 25 | 2 | +8 | 27 | 3 | +7 |
| Example 12 of the present invention | 19 | 2 | +11 | 20 | 1 | +5 |
| Example 13 of the present invention | 12 | 2 | +17 | 14 | 2 | +14 |

As is clear from Table 3, in Examples 11 to 13, even when "the thicknesses of the insulating film on the flat surface part" were set to be as thinner (12 to 25 μm) than "the thickness of the insulating film on the flat surface part (38 μm)" in Example 1, the measurement values and the ratios of "the uniformity of the thickness of the insulating film on the flat surface part" were substantially uniformly maintained at 2 μm and at +8 to +17% respectively, and the difference between the thickness of the insulating film on the flat surface part of the copper sheet and the thickness of the insulating film on the corner part of the copper sheet, that is, the measurement values and the ratios of "the insulating film thickness difference between one on the flat surface part and one on the corner part" were maintained to be as small as 2 to 3 μm and +7 to +14% respectively.

INDUSTRIAL APPLICABILITY

The electrodeposition-coated body of the present invention can be used as power inductors for power supply for personal computers and smartphones, transistors of in-vehicle inductors, and the like.

REFERENCE SIGNS LIST

101b: Flat conductive wire (conductive wire with a rectangular cross section)
102: Electrodeposition dispersion
112: Polyamide-imide particle having a low average particle size

The invention claimed is:
1. An electrodeposition dispersion comprising:
a polyamide-imide resin;
a polar solvent;
water;
a poor solvent having a solubility of polyamide-imides of 1 g/100 g-the solvent or less; and
a base,
wherein the polar solvent is an organic solvent having a boiling point of higher than 100° C. and $D_{(S-P)}$ represented by a formula (1) satisfying a relationship of $D_{(S-P)}<6$, where $D_{(S-P)}$ represents a Hansen solubility parameter value (HSP value),
a weight-average molecular weight of the polyamide-imide resin is $10\times10^4$ to $30\times10^4$ or a number-average molecular weight of the polyamide-imide resin is $2\times10^4$ to $5\times10^4$,
an average size of the polyamide-imide resin particles is 400 nm or less,

$$D_{(S-P)}=[(dD^S-dD^P)^2+(dP^S-dP^P)^2+(dH^S-dH^P)^2]^{1/2} \quad (1)$$

where $dD^S$ represents a dispersion term of an HSP value of the polar solvent, $dD^P$ represents a dispersion term of an HSP value of the polyamide-imide resin, $dP^S$ represents a polarity term of the HSP value of the polar solvent, $dP^P$ represents a polarity term of the HSP value of the polyamide-imide resin, $dH^S$ represents a hydrogen bonding term of the HSP value of the polar solvent, and $dH^P$ represents a hydrogen bonding term of the HSP value of the polyamide-imide resin,
the poor solvent is selected from the group consisting of isopropyl alcohol, 1-methoxy-2-propanol and cyclohexanone, and
the average size of the polyamide-imide resin particles is in a range of 130 to 290 nm.
2. The electrodeposition dispersion according to claim 1, wherein the polar solvent satisfies the relationship of $D_{(S-P)}<6$ under a presumption that:
a polyamide-imide-soluble polar solvent is defined as a polar solvent capable of dissolving polyamide-imide particles to form a transparent mixture;
a polyamide-imide-insoluble polar solvent is defined as a polar solvent incapable of dissolving polyamide-imide particles to form a white turbid mixture; and in a three-dimensional graph where $dD^S$s, $dP^S$s, and $dH^S$s are plotted, a center of a minimum sphere including all of points represented by the polyamide-imide-soluble polar solvent therein is defined as the $dD^P$, $dP^P$, and $dH^P$.

3. The electrodeposition dispersion according to claim 1, wherein the polar solvent is a hydrophilic solvent.

4. The electrodeposition dispersion according to claim 1, wherein the polar solvent is N,N-dimethylacetamide, N,N-dimethylformamide, propylene carbonate, dimethyl sulfoxide, 4-butyrolactone, N-methyl-2-pyrrolidone, or 1,3-dimethyl-2-imidazolidinone.

5. The electrodeposition dispersion according to claim 1, wherein the base is selected from the group consisting of N,N-dimethylaminoethanol, tripropylamine and triethanolamine.

6. An electrodeposition-coated body comprising:
a body to be coated; and
an insulating film which is formed on a surface of the body to be coated while using the electrodeposition dispersion according to claim 1,
wherein, in the insulating film formed on the surface of the body to be coated, the number of pinholes is 50 pinholes/10 μm² or less, a surface roughness Ra is 50 nm or less,
the body to be coated is a conductive wire with a rectangular cross section, and
a difference between a thickness of the insulating film on a flat surface part of the conductive wire and a thickness of the insulating film on a corner part of the conductive wire is 5 μm or less.

\* \* \* \* \*